Figure 1:
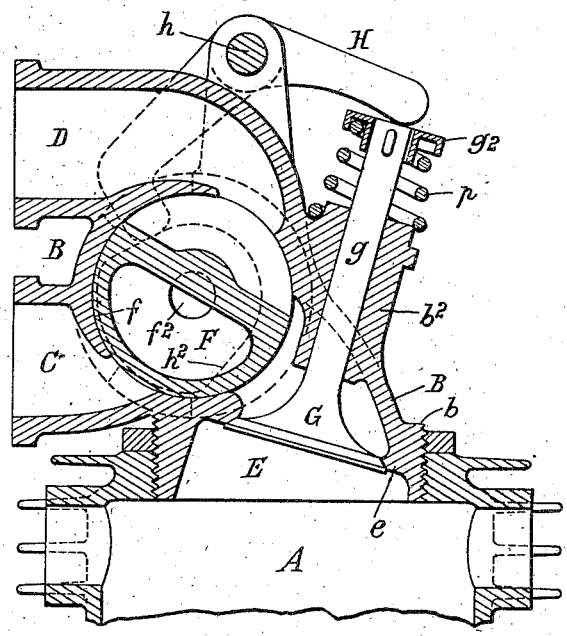

G. R. INSHAW.
VALVULAR ARRANGEMENT OF INTERNAL COMBUSTION ENGINES.
APPLICATION FILED JAN. 27, 1921.

1,374,158.

Patented Apr. 5, 1921.
5 SHEETS—SHEET 1.

INVENTOR
GEORGE R. INSHAW
BY Horron and Horron
ATTORNEYS

G. R. INSHAW.
VALVULAR ARRANGEMENT OF INTERNAL COMBUSTION ENGINES.
APPLICATION FILED JAN. 27, 1921.

1,374,158.

Patented Apr. 5, 1921.
5 SHEETS—SHEET 2.

INVENTOR
GEORGE R. INSHAW
BY
ATTORNEYS

INVENTOR
GEORGE R. INSHAW
BY
ATTORNEYS

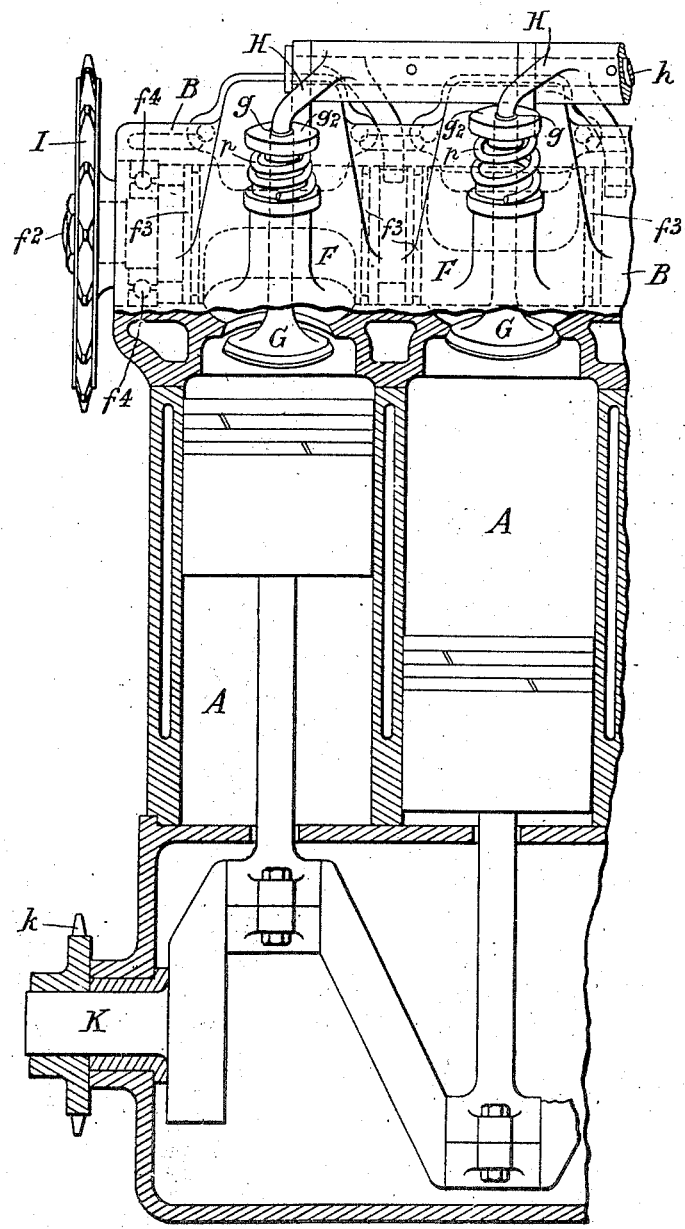

UNITED STATES PATENT OFFICE.

GEORGE RICHARD INSHAW, OF POLLOKSHIELDS, NEAR GLASGOW, SCOTLAND.

VALVULAR ARRANGEMENT OF INTERNAL-COMBUSTION ENGINES.

1,374,158. Specification of Letters Patent. Patented Apr. 5, 1921.

Application filed January 27, 1921. Serial No. 440,490.

*To all whom it may concern:*

Be it known that I, GEORGE RICHARD INSHAW, a subject of the King of Great Britain, residing at Murcia House, Pollokshields, near Glasgow, North Britain, have invented new and useful Improvements in Connection with the Valvular Arrangements of Internal Combustion Engines, of which the following is a specification.

My invention relates to internal combustion engines working on the four-cycle principle and of the kind wherein the valvular arrangements comprise a tappet-valve, which is opened at the proper times for induction and exhaust and closed during the compression and working strokes and controls a passage to the cylinder which passage is put in communication, at the proper times, with the induction and exhaust passages, by means of a rotary distributing valve, which is operated so that, when the tappet-valve is open, the said distributing valve is open to either the induction, or the exhaust. The object of my invention is to provide an improved construction of such valvular arrangements which is simple and efficient in action and also economical in first cost and maintenance and which moreover allows of ready access to the parts for cleaning and repairs.

According to my invention the valve-casing consists of a casting for attachment to the end of the cylinder where admission and exhaust take place, the said casting comprising the induction port, the exhaust port, and the port to and from the cylinder with which the first named two ports communicate, there being a circular seating between the three ports for a rotary distributing valve, whose axis is in a plane parallel with the shaft of the engine, and an inclined seating for an inclined tappet-valve which controls the port to and from the cylinder and an inclined guide for the stem of the said valve. The said tappet-valve is preferably operated by a rocking-lever acted upon by a cam on the axis of the distributing valve, the said distributing valve being provided with spring-packing and the bearings of the said valve being upon an extended portion of the axis and allowing of the passage of air past the ends of the valve.

In the case of single cylinder engines I preferably arrange the parts so that a sprocket-wheel on the engine shaft and a sprocket-wheel on the axis of the distributing valve and a sprocket-wheel on the axis of the magneto will allow one chain to be passed over all three of the said sprocket-wheels and drive both the distributing valve and the magneto, from the engine shaft, the said magneto being arranged so that it can be moved along a support therefor and be fixed in position so that the chain can be tightened up by movement of, and refixing, the said magneto.

Figure 3:
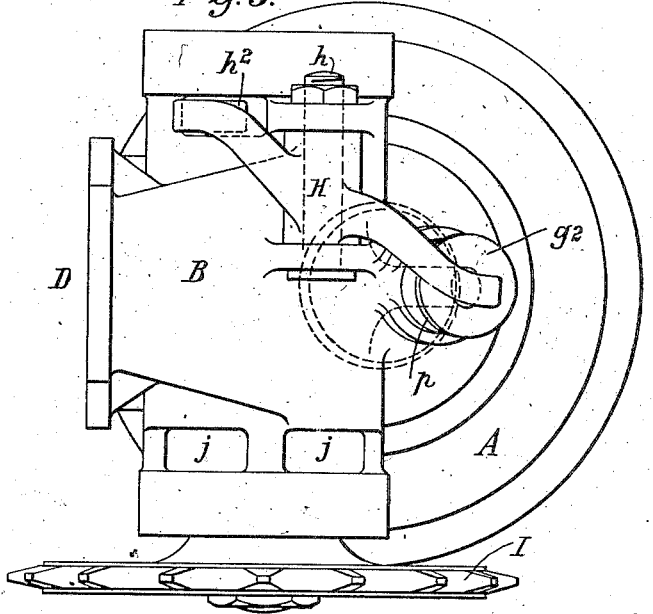
Figure 2:
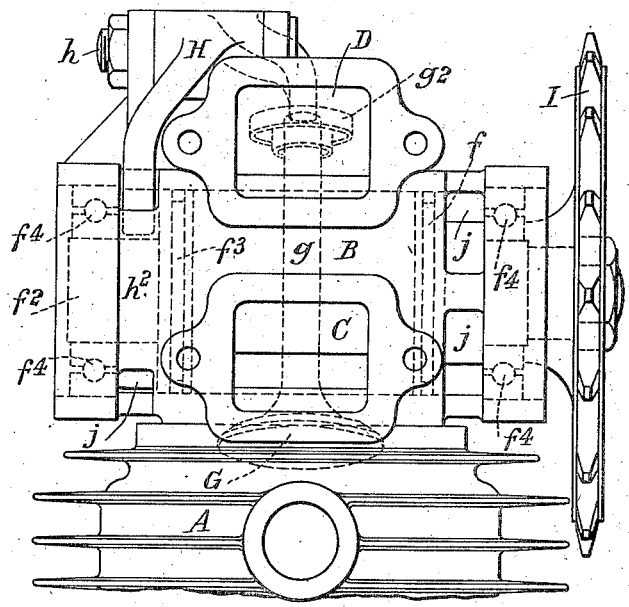
Figure 4:
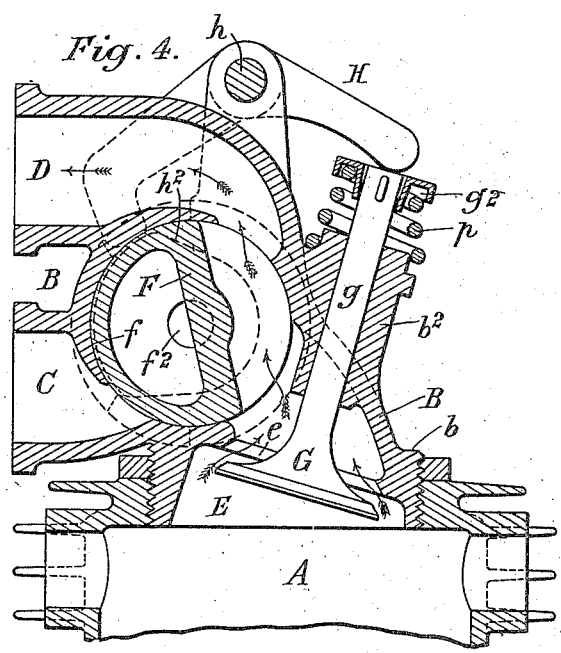
Figure 6:
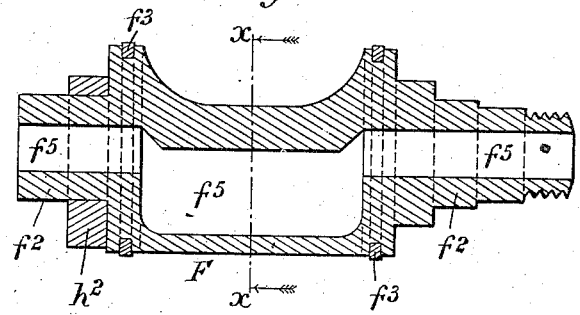
Figure 7:
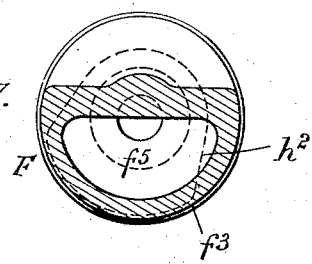
Figure 5:
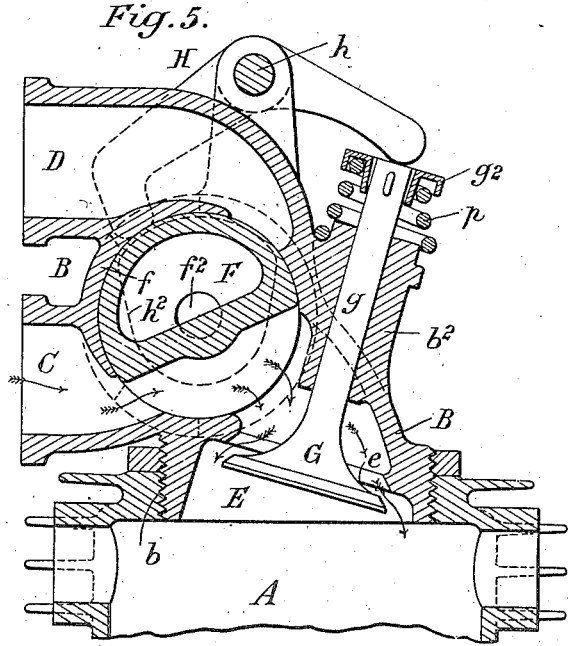
Figure 9:
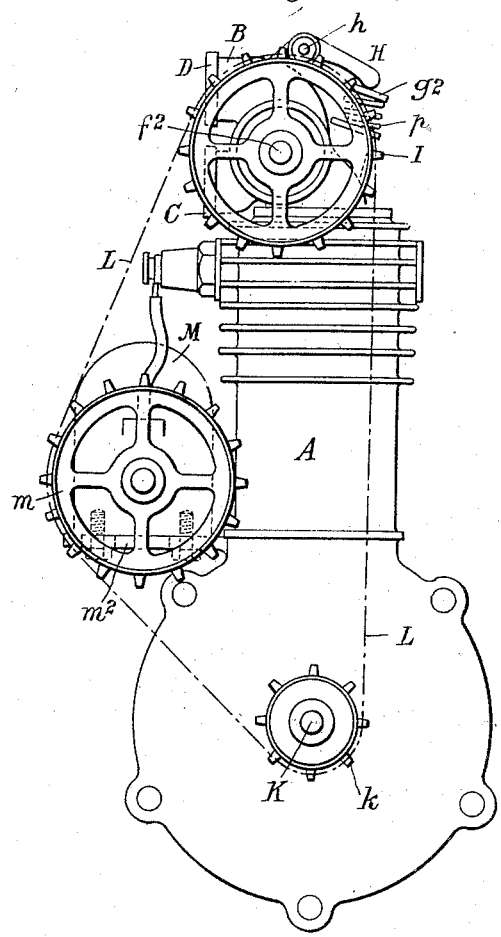

The following description with reference to the accompanying drawings will explain how my invention can be performed. Figure 1 is a vertical section of so much of an internal combustion engine as is necessary to show the application of my invention thereto. The position is that in which the exhaust-stroke of the piston is about to commence. Fig. 2 is a side elevation and Fig. 3 a plan. Figs. 4 and 5 are sections like Fig. 1, but respectively showing the position when the piston has moved through a portion of its exhaust stroke and the position when the inlet port is open. Figs. 6 and 7 are respectively a longitudinal section and a transverse section (on the line $x$, $x$, Fig. 6) of the rotary distributing valve. Fig. 8 is an elevation, partly in section, showing an arangement of two cylinders side by side, and Fig. 9 is an elevation showing the mode of driving the distributing valve and the magneto by one chain.

In the construction in accordance with my invention there is, in direct communication with the cylinder A, at the end where admission and exhaust take place, a valve-casing, consisting of a casting B, adapted to be secured, by a screw connection $b$, or other suitable means, to the end of the cylinder A and comprising the induction port C, the exhaust port D, and the port E, to and from the cylinder and also a housing, or circular seating, $f$, for the rotary distributing valve F (whose axis is in a plane parallel with the shaft of the engine) and a seating $e$ for the tappet-valve G, and likewise a guide $b^2$ for the stem $g$, of the said tappet-valve.

The said tappet-valve seating $e$, and the guide $b^2$ for the stem of the said valve, are at such an inclination to a continuation of the axial line of the cylinder A, that the distributing valve F, can be arranged in such proximity to the tappet-valve G, and in, or about, axial line with the cylinder and the opening to the exhaust port D, that the exhaust gases pass the distributing valve F, in axial, or approximately axial, line with the cylinder A, and the said distributing valve F is protected, as far as possible, from impingement thereon of the hot exhaust gases and the scavenging is better effected. The tappet-valve G is operated, to open it, by a rocking-lever H, centered at $h$, and acted upon by a cam $h^2$ on the axis $f^2$ of the distributing valve F, which can be driven by any suitable gear, such, for example, as a chain, from the driving shaft of the engine, and passing over a sprocket-wheel I, keyed on the said axis $f^2$. The said valve is closed by the spring $p$, acting upon a cap-piece $g^2$ secured to the stem $g$.

The distributing valve F, has its axis parallel with the engine shaft and is packed toward each of its ends by split spring packing-rings $f^3$, which are arranged so that they can remain stationary, while the valve rotates within them, and be capable of moving longitudinally within the valve-casing should there be any differential expansion between the casing and the distributing valve.

In the case of air-cooled engines, it is preferred that the bearings $f^4$, for the rotary distributing valve shall be arranged on an extended portion of the axis of the valve as shown, so as to allow of the passage of air between the valve-ends and the bearings, the valve being preferably cored, as shown at $f^5$, in Figs. 6 and 7, to allow air to pass through it. The valve-casing, or casting, has slots $j$ in it for the aforesaid passage of air and to allow one arm of the rocking-lever H which operates the tappet-valve G to bear on the cam $h^2$ on the axis of the distributing valve F.

In certain applications of my invention; for example, when it is applied to motor-cycle engines, where the distributing valve is, as hereinbefore mentioned, driven by a chain passing over a sprocket-wheel $k$ (see Figs. 8 and 9) on the engine shaft K, and a sprocket-wheel I, on the axis of the distributing valve F, the same chain L, can also be employed to work the magneto M, by passing the said chain L, also over a sprocket-wheel $m$, on the axis of the magneto M. By making the magneto so that it can be slid along its support $m^2$ and be fixed in the position to which it has been brought it can be utilized to take up any slack which may occur in the chain L.

The invention can be employed in connection with engines having one, or more than one, cylinder by arranging the valves and their adjuncts in line as illustrated in Fig. 8. The engine here shown is presumed to be one with the water circulation around the cylinder and through pipes to a radiator so that no fins are shown in this figure.

What I claim is:—

1. In an internal combustion engine having an explosion cylinder at one end of which admission and exhaust take place, a valve casing consisting of a casting for attachment to said end of the cylinder, said casting having an induction port and an exhaust port arranged within the area defined by the bore of the cylinder, and a port communicating with the cylinder and with the two ports aforesaid, said cylinder port and exhaust port being substantially in line with the axis of the cylinder to afford a free escape for the exhaust gases, a circular seating between the three ports, a rotary distributing valve mounted in said seating on an axis at right angles to the axis of the cylinder, an inclined tappet-valve seating arranged between the cylinder end and the rotary valve port communicating with the cylinder and in close proximity to the latter, an inclined tappet valve engaging said tappet-valve seating to control the port to and from the cylinder, and an inclined guide for the stem of the valve, substantially as described.

2. The combination with the construction specified in claim 1, of a rocking lever to actuate the tappet valve, and a cam on the axis of the distributing valve controlling the movement of said rocking lever.

3. The combination with the construction specified in claim 1, of spring packings at opposite ends of the rotary distributing valve and arranged between the latter and the valve casting.

4. The combination with the construction specified in claim 1, of extended bearing trunnions at opposite ends of the rotary distributing valve, and roller bearings for said trunnions to allow the passage of air past the ends of the valve, for the purpose specified.

5. In the construction specified in claim 1, a rotary distributing valve internally cored and freely open at its opposite ends to permit the passage of cooling air therethrough.

In testimony whereof I have signed my name to this specification in the presence of two subscribing witnesses.

GEORGE RICHARD INSHAW.

Witnesses:
LAURA WYLIE,
MARGARET THOMLINSON.